United States Patent [19]

Sharp, Jr.

[11] Patent Number: 5,136,638
[45] Date of Patent: Aug. 4, 1992

[54] INTEGRAL HANDSET SUPPORTING HOOK AND NUMBER CARD COVER

[75] Inventor: James M. Sharp, Jr., Corinth, Miss.

[73] Assignee: International Telecommunication Corp., Memphis, Tenn.

[21] Appl. No.: 508,073

[22] Filed: Apr. 10, 1990

[51] Int. Cl.⁵ .............................................. H04M 1/00
[52] U.S. Cl. ..................................... 379/435; 379/436
[58] Field of Search ................ 379/435, 436, 447, 450

[56] References Cited

U.S. PATENT DOCUMENTS

| | | |
|---|---|---|
| 3,941,951 | 3/1976 | Engstrom et al. |
| 4,395,591 | 7/1983 | Kaczkos ............................. 379/435 |
| 4,731,836 | 3/1988 | Awakowicz et al. ............. 379/435 |
| 4,768,225 | 8/1988 | Bloechl et al. ...................... 379/435 |

FOREIGN PATENT DOCUMENTS

| | | |
|---|---|---|
| 3207824A1 | 9/1983 | Fed. Rep. of Germany . |
| 0114054 | 6/1985 | Japan ................................. 379/435 |
| 0140963 | 7/1985 | Japan ................................. 379/435 |
| 60-160758 | 8/1985 | Japan . |
| 60-160759 | 8/1985 | Japan . |

Primary Examiner—James L. Dwyer
Assistant Examiner—Jasan Chan
Attorney, Agent, or Firm—Ware, Fressola, Van Der Sluys & Adolphson

[57] ABSTRACT

An integral handset supporting hook and number card cover for supporting a handset for a wall or desk mounted telephone subset comprises a hook portion which can be mounted in either a wall or desk mounting position and a number card cover portion for protectively covering the local telephone number card. The hook/cover is comprised of a clear plastic or polymeric material thereby allowing a user to see the number through the hook/cover. The hook/cover is easily adaptable for use with a wall mounted unit utilizing a protruding hook for supporting a handset or with a desk mounted unit employing the same hook in an inverted position where the hook is recessed and does not interfere with the lifting of the handset.

9 Claims, 2 Drawing Sheets

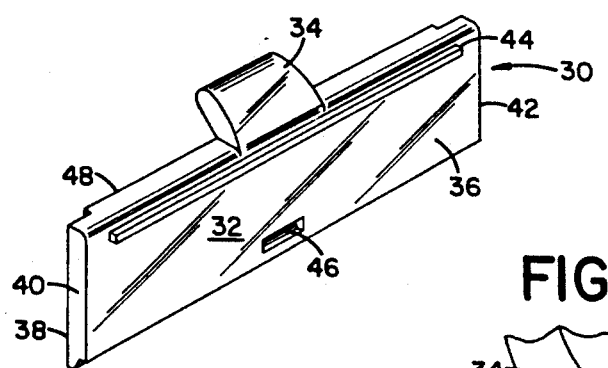
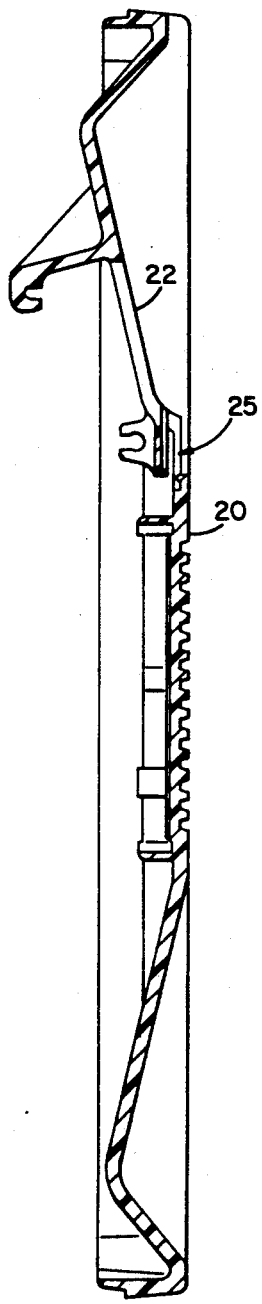
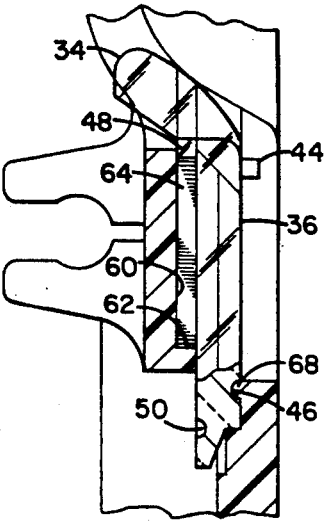
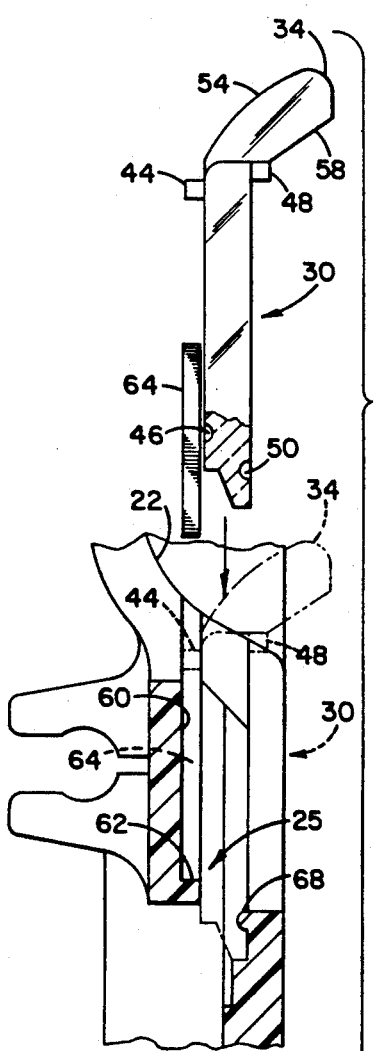
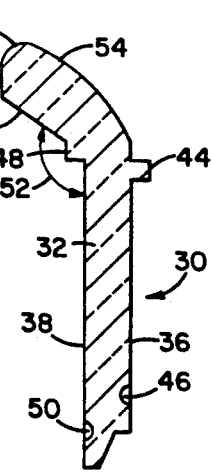

INTEGRAL HANDSET SUPPORTING HOOK AND NUMBER CARD COVER

BACKGROUND OF THE INVENTION

1. Field of the Invention

The present invention relates generally to desktop and wall mountable telephone subsets and more particularly to an integral handset supporting hook and number card cover.

2. Description of the Prior Art

For many years, telephone subsets have been designed for dual use as desk units and wall units. In such subsets, a handset supporting hook is required to support the handset in the handset cradle when the subset is wall mounted; however, the hook must not interfere with the handset if the telephone subset is desk mounted.

Some combination wall/desk telephone subsets utilize a hook which protrudes outwardly thus supporting the handset when the subset is wall mounted. The hook may be removed entirely or may be disconnected, flipped over, and resecured thereby providing a contour which is flush with the handset cradle and does not interfere with the handset when the unit is desk mounted. Handset hooks have been mounted to subsets in various ways. Some are screwed in place while others are clipped onto the front cover of the telephone subset. Still others utilize clips which may slide from left to right depending upon whether the subset is wall or desk mounted. Some hooks are resiliently mounted so they can be depressed and rotated out of the way when the subset is desk mounted.

Subsets also provide a number card on which the local telephone number may be written or typed. The card is displayed on the telephone subset usually on the front cover. Normally, the telephone number is written or typed on a paper insert which is covered by a clear plastic strip which snaps into the subset's front cover.

Some of the drawbacks of traditional number card covers and supporting hooks are that two separate components must be manufactured per telephone unit, thus adding cost and complicating manufacture and assembly. Additionally, traditional number card covers are difficult to remove by a user who desires to change the telephone number on the paper insert. A pointed object must usually be inserted into a small hole in the phone number card cover, manipulating the cover in such a way that it bows outwardly thus freeing a tab which holds the cover in a recess. This procedure frequently results in the cover propelling itself from the subset and out of the control of the user.

SUMMARY OF THE INVENTION

The present invention is designed to overcome the limitations that are attendant upon the use of traditional number card covers and convertible handset supporting hooks and toward this end, it contemplates the provision of a novel integral handset supporting hook and number card cover, or hook/cover, which operates both to support a handset in a telephone substation which is desk or wall mounted and to provide a clear attractive telephone number card cover.

The present invention comprises a hook/cover fashioned as a somewhat flat piece of clear plastic or polymeric material having a slightly angled protrusion extending therefrom. The hook/cover is easily inserted into a slot in the telephone subset front cover where it snaps into place. The hook/cover may be inserted by the user in one of two operating positions, with the protrusion extending away from the subset thus providing a supporting hook for a handset when the subset is wall-mounted, or with the protrusion extending inwardly towards the subset substantially flush with the handset cradle thereby not interfering with the lifting of the handset when the subset is desk mounted.

The flat portion of the hook/cover provides a transparent protective cover behind which a paper tab, having the local telephone number typed or written upon it, may be stored.

The hook/cover may be simply inserted in one of two operating positions depending upon whether the subset is to be wall mounted or desk mounted. The hook/cover may be removed for making a change to the telephone number printed on the paper insert.

A primary object of the present invention is to provide a hook/cover this is configured to be mounted in one of two operating positions.

Another object of the present invention is to provide a hook/cover which may be easily removed and reinserted by a telephone user.

Another object of the present invention is to provide a hook/cover which provides a protective cover for a telephone number card positioned behind the hook/cover.

Another object of the present invention is to provide a clear, visually-pleasing hook/cover for use with wall or desk mounted telephone subsets.

The above and other objectives and advantages of the invention will become more apparent upon reading the description of the invention in connection with the drawings described below.

DESCRIPTION OF THE DRAWINGS

FIG. 2 is an isometric view of the hook/cover of the present invention.

FIG. 3 is a side view, in cross-section, of the hook/number cover of the present invention.

FIG. 4 is a side view, in partial cross-section taken along line 4—4 of FIG. 1, of the subset front cover illustrating a front cover recess for retaining the hook/cover of the present invention.

FIG. 5 is an exploded side view, in partial cross-section, of a portion of a subset front cover, showing the hook/cover of the present invention and a number card prior to and subsequent to insertion in the front cover recess.

FIG. 6 is a side view, in partial cross-section, of a portion of a subset front cover, showing the hook/cover of the present invention and number card properly assembled in a desk mount position.

DESCRIPTION OF THE PREFERRED EMBODIMENT

Figure 1:
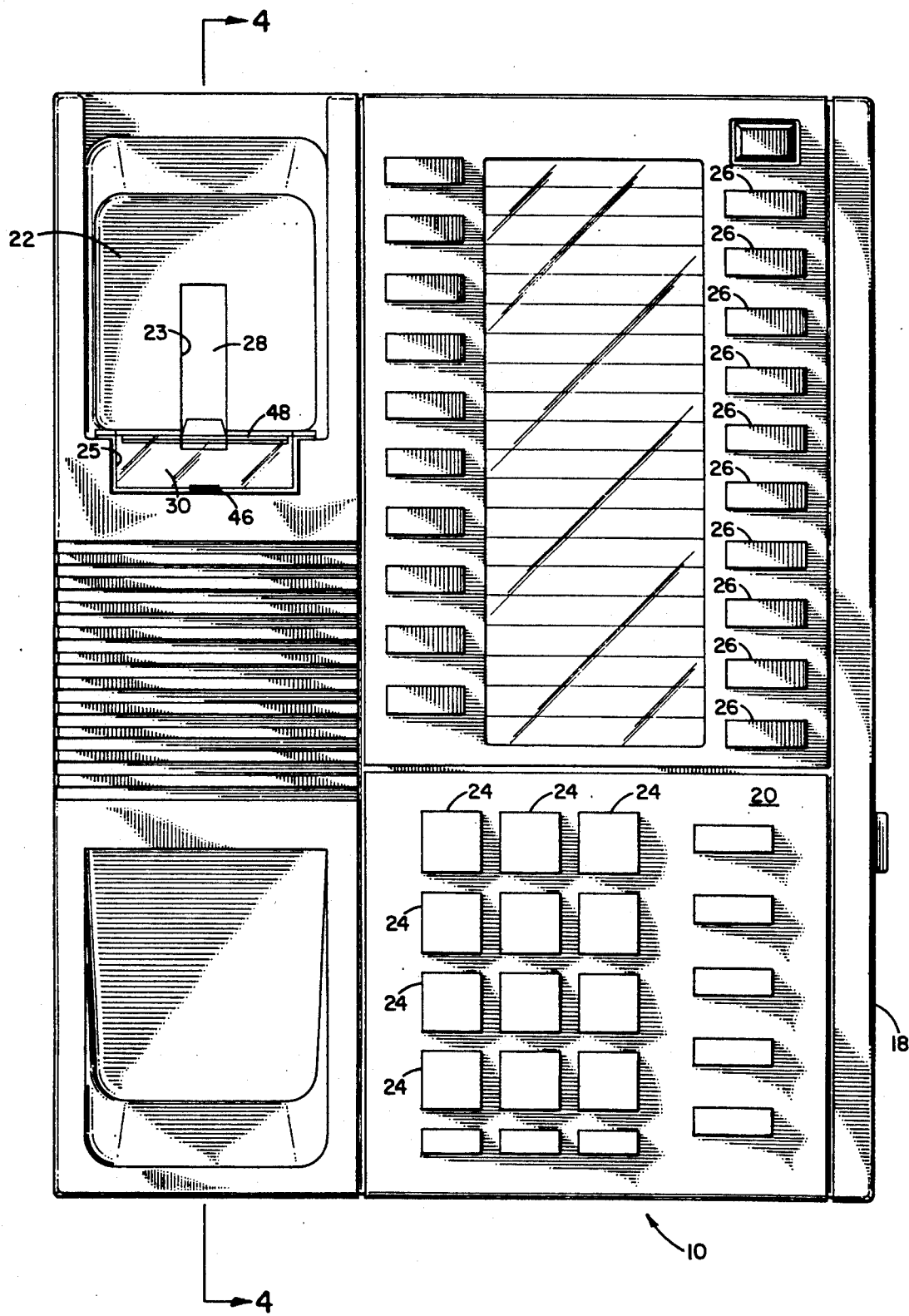
FIG. 1 is a top view of a telephone subset incorporating the hook/cover of the present invention.

FIG. 1 illustrates a telephone subset 10 comprising a base member 18 and a front cover 20 having a handset cradle 22 along with a plurality of apertures for pushbuttons 24, memory keys 26, etc. of the base member 18. The front cover 20 additionally has in the handset cradle 22, an aperture 23 for a hook switch 28 and a slot 25 for an integral handset supporting hook/number card cover (hereinafter "hook/cover") 30.

Referring now to FIG. 2, the hook/cover 30 of the present invention is illustrated. The hook/cover 30 is formed of transparent plastic or polymeric material. The hook/cover 30 is basically comprised of two integral portions: a number card cover portion 32 and a supporting hook portion 34. As can be seen in FIGS. 2 and 3, number card portion 32 is substantially flat, having first and second parallel planar faces 36, 38 and first and second parallel planar sides 40, 42.

First planar face 36 has an upper ledge 44, which slightly protrudes from the planar face traversing the substantial width of the top portion of face 36, and a lower groove 46 lying parallel with ledge 44 along the lower portion of face 36 but substantially shorter in length than ledge 44.

Second planar face 38 has a similarly protruding ledge 48 spanning the substantial width of the upper portion of planar face 38, and a similar groove 50, extending parallel with ledge 48 but substantially shorter in length. While on opposite faces, ledge 44 is situated slightly lower vertically than ledge 48, and upper groove 50 is located slightly lower vertically than the groove 46.

As shown in FIG. 3, the supporting hook portion 34 comprises a curved or rounded upper surface 54 and planar lower surface 58 and is formed integrally with the top of the number card cover portion 32, extending from the substantial center of an upper edge of the cover portion 32. The supporting hook portion 34 is disposed at an angle 52 to the planar surface 38. The angle 52 should be selected such that the hook/cover 30 may be utilized effectively in both desk and wall mount conditions. The angle 52 is preferably between 120 degrees and 150 degrees.

FIG. 4 shows, in cross-section, the front cover 20 of telephone subset 10, illustrating handset cradle 22 and slot 25. Hook/cover 30 snaps into slot 25 in one of two operating positions as will be described below.

FIG. 5 depicts, in an enlarged view, hook/cover 30 and number card 64 exploded from slot 25. Slot 25 comprises a back wall 60, a platform 62, and a positioning tab 68. Hook/cover 30 is positioned in slot 25 by tab 68 snapping into groove 50 as shown in dashed lines. Number card 64 is positioned on platform 62, sandwiched between hook/cover 30 and back wall 60. Ledge 44 ensures that number card 64 is positioned against platform 62. Hook/cover 30, as shown in FIG. 5, is in the wall mount with the supporting hook portion 34, extending outwardly from handset cradle 22 for supporting a handset having a notch dimensioned to receive supporting hook portion 34.

In FIG. 6, hook/cover 30 is mounted in a desk mount position. Tab 68 is snugly snapped in groove 46 while number card 64 is positioned on platform 62, sandwiched between hook/cover 30 and back wall 60. Ledge 48 ensures that number card 64 is positioned against platform 62. In this configuration, hook/cover 30 is positioned lower than in the configuration of FIG. 5 and the supporting hook portion 34 is recessed in aperture 23 in the handset cradle 22, eliminating the risk of a handset snagging hook/cover 30 when lifted from handset cradle 22. Depending upon the actual contour of the cradle 22, the hook/cover 30 can be positioned at the same level for both configurations and the supporting hook portion 34 will not interfere with the handset in the desk mount configuration.

In the preferred embodiment as shown, grooves 46, 50 and ledges 44, 48 of hook/cover 30 are positioned such that, when in a desk mount configuration, groove 46 and ledge 48 operatively allow portion 34 of hook/cover 30 to be recessed in handset cradle 22, and, when in a wall mount configuration, groove 50 and ledge 44 operatively allow hook/cover 30 to extend upwardly out of the handset cradle 22. In both cases, number card 64 is sandwiched between hook/cover 30 and back wall 60 and between platform 62 and one of the ledges.

Thus, it can be seen from the foregoing specification and attached drawings that the hook/card cover of the present invention provides an effective means for supporting a handset for a wall or desk mounted telephone subset while simultaneously being utilized as a clear number card cover which can be removed without difficulty.

What is claimed is:

1. A telephone subset for desk mounting or wall mounting comprising:
   a cover having a handset cradle, said cradle having a back wall defining a boundary of a slot for receiving a hook/cover;
   a number card for displaying a telephone number;
   a hook/cover formed of transparent material having a hook portion for supporting said handset during subset wall mounting and a cover portion integrally formed with said hook portion for covering said number card; and
   means formed in said slot for selectively securing said hook/cover in a desk mounting or wall mounting position, said hook/cover securing means formed integrally with said cover portion,
   whereby said hook/cover may be secured in said slot in a desk mounting position or a wall mounting position and said number card is sandwiched between said hook/cover and said back wall.

2. A telephone subset as described in claim 1, wherein said hook portion protrudes outwardly from said handset cradle when said hook/cover is configured in said wall mounting position.

3. A telephone subset as described in claim 2, wherein said hook portion comprises a first lower face and a second upper face, and said upper face being rounded.

4. A telephone subset as described in claim 1, wherein said cover portion comprises first and second planar surfaces.

5. A telephone subset as described in claim 1, wherein said slot has a projecting retaining tab and said securing means comprises a first groove for securing said hook/cover in said desk mounting position and a second groove for securing said hook/cover in said wall mounting position.

6. A telephone subset as described in claim 5, wherein said slot also includes a platform for supporting said number card.

7. A telephone subset as described in claim 1, wherein the hook portion of the hook/cover is disposed at an angle to the cover portion so that in the wall mounting position the hook portion extends outwardly from the handset cradle and in the desk mounting position the hook portion is recessed in the handset cradle.

8. A hook/cover for use with a telephone subset to provide both a number card cover and a handset supporting hook, said subset being designed for wall mounting or desk mounting and including a hook/cover receiving slot with a projecting retaining tab, said hook/cover comprising:

a cover portion for covering a number card, said cover portion being formed of transparent material;

a hook portion integrally formed with and protruding from said cover portion; and means integrally formed with said cover portion for securing said hook/cover to said telephone subset, said securing means comprising means for selectively securing said hook/cover in a desk mounting position or a wall mounting position, including a first groove on a first side for receiving said tab and securing said hook/cover in said desk mounting position and a second groove on a second opposite side for receiving said tab and securing said hook/cover in said wall mounting position when the orientation of said hook/cover is inversed.

9. A hook/cover as described in claim 8, wherein said hook/cover further comprises a first ledge on said first side for retaining said number card when said hook/cover is secured in said wall mounting position and a second ledge on said second side for retaining said number card when said hook/cover is in said desk mounting position.

* * * * *